Dec. 30, 1958 T. I. DUFFY 2,866,654
BICYCLE KICK STAND
Filed Jan. 14, 1957
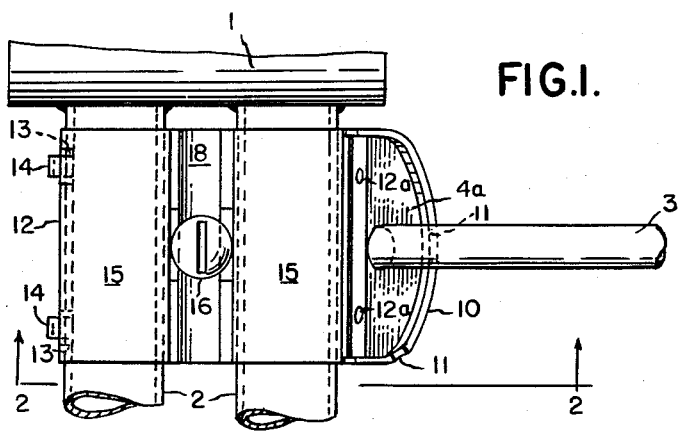
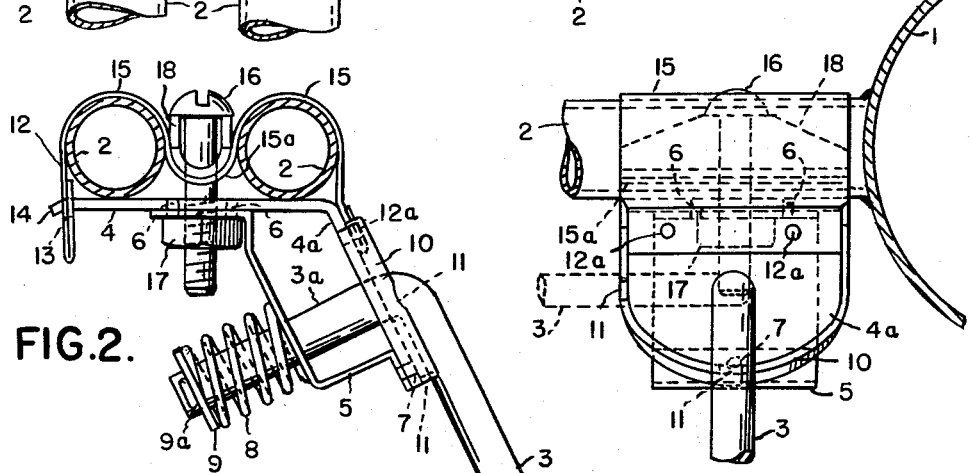
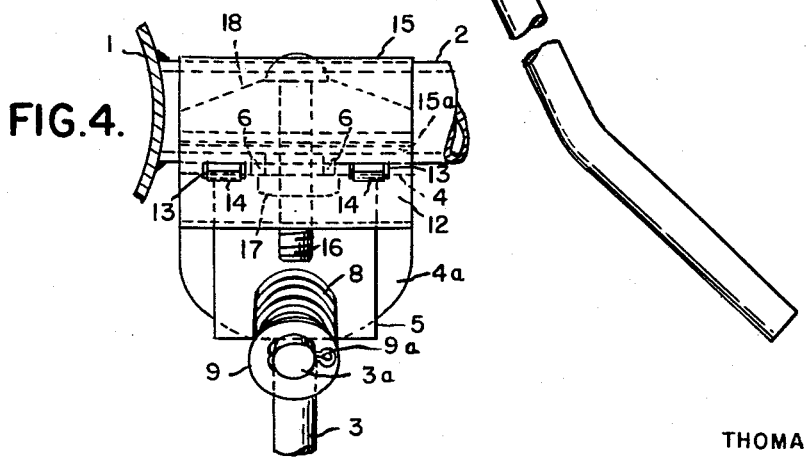
INVENTOR.
THOMAS I. DUFFY
BY
*J.S. Murray*
ATTORNEY United States Patent Office 2,866,654
Patented Dec. 30, 1958

2,866,654

BICYCLE KICK STAND

Thomas I. Duffy, Spring Lake, Mich., assignor to Ethel M. Benedict, Detroit, Mich.

Application January 14, 1957, Serial No. 633,979

2 Claims. (Cl. 280—301)

This invention relates to kick-stands such as are attachable to bicycles to maintain the latter substantially upright when not in use.

An object of the invention is to facilitate attachment of a kick-stand to and its detachment from a bicycle frame.

Another object is to provide upper and lower jaws for clamping a kick-stand on the bicycle frame, the upper jaw being freely flexible to conform itself under clamping pressure to the contour of a frame element, thus distributing clamping pressure over a considerable area of such element.

Another object is to adapt said flexible jaw to bridge the spaced furcations of a bicycle and conform itself to their contour responsive to a bolt or the like interconnecting the jaws and disposed between the furcations.

Another object is to permanently interconnect the clamping jaws at one margin of the upper jaw and to utilize flexibility of said jaw to afford the up and down swinging thereof such as to afford insertion of said furcations between or their withdrawal from the paired jaws.

Another object is to provide means for latching the upper jaw to the lower one at jaw margins remote from said permanent interconnection.

Another object is to provide an improved means for pivotally mounting the leg of a kick-stand on one of a pair of jaws clamping the stand on a bicycle frame, and for yieldably maintaining either the use or non-use pivotal position of such leg.

These and various other objects are attained by the construction hereinafter described and illustrated in the accompanying drawing, wherein:

Fig. 1 is a top plan view of the kick stand installed on the rear fork of a bicycle.

Fig. 2 is a vertical sectional view of the same, taken on the line 2—2 of Fig. 1.

Fig. 3 is a view in side elevation of the device, as shown in Fig. 2.

Fig. 4 is as opposite side elevational view.

In these views, the reference character 1 designates the usual cylindrical crank hanger housing of a bicycle frame, and 2 the usual spaced furcations rigidly and rearwardly extending from such housing to mount a rear wheel (not shown).

My improved kick-stand comprises the usual leg 3 having its upper end portion 3a bent at substantially a right angle to form a pivot member adapting the leg to swing from the downwardly and outwardly inclined position of use to a substantially horizontal raised position of non-use. Said pivot member is journaled centrally in a lug 4a integrally projecting downwardly from a sheet metal clamping jaw 4 and inclined to conform to the leg inclination when the kick-stand is in use. The bent plate 4, 4a is strongly reinforced by a sheet metal bracket 5 underlying such plate and riveted at 6 to the jaw 4 and at 7 to the lower portion of the lug 4a. A mid portion of said bracket is parallel to and spaced from the lug and provides a second pivot bearing for the leg. The pivot portion 3a of the leg projects beyond the bracket 5 to mount a coiled spring 8, compressed between the bracket and a washer 9 abutting a cotter pin 9a carried terminally by said portion 3a. Such spring thus urges the leg toward the lug 4a and into engagement with the flange 10, marginally formed on the lug and confronting the leg. The lower portion of the lug and its flange form a semicircle centered at the axis of the pivot 3a. The flange 10 is formed with two shallow notches 11 substantially ninety degrees apart, and serving respectively to receive the leg in its lowered use position and raised stored position, the latter being shown in dash lines in Fig. 3. The spring 8 predeterminedly resists disengagement of the leg from either notch.

The jaw 4 engages beneath the furcations 2 in installing the kick-stand and coacts with an upper jaw 12 arched to straddle the furcations and formed of relatively thin flexible, resilient sheet metal. The jaw 12 has one margin thereof riveted at 12a to the top portion of the lug 4a and is formed adjoining its opposite margin with two aligned slots 13 to receive a pair of tongues 14 terminally projecting from the jaw 4. Such tongues project slightly downward toward their free ends (see Fig. 2) to increase the retention afforded the upper jaw under clamping stress. Preferably each of the described margins is return-bent to achieve a double thickness and consequent reinforcement. Between said margins, the jaw 12 is formed with two similar upwardly curved corrugations 15, which are interconnected by a more narrow downwardly curved corrugation 15a. The corrugations 15 straddle and substantially conform to the furcations 2, and the corrugation 15a is centrally traversed by a bolt 16 extending through the jaw 4 and upper margin of the bracket 5 and receiving a nut 17 upwardly seating against such bracket. The bolt has on its upper end a head seating on and bridged across a channel shaped presser bar 18 freely set into and conforming to the corrugation 15a and coextensive with the several corrugations. Thus the clamping stress applied by the bolt and nut is transmitted through the central area of the flexible upper jaw. The nut 17 is so fitted in an angle of the bracket 5 as to be locked against rotation.

The described formation of the upper jaw permits of a considerable regulation of the size of the corrugations 15, adapting them to conform to such variations in dimensions as are found in various sizes and makes of bicycles. Also, the flexible corrugated form of the upper jaw permits the latter to conform itself to a considerable area of the furcations, eliminating the possibility of imposing a flattening effect on the furcations as in constructions now common. Present day clamps apply stresses which are localized in the axial vertical planes of the furcations 2 and hence tend to undesirably deform the latter.

The bracket 5 strongly reinforces the plate 4, 4a, while further functioning as a spring abutment, a bearing for the pivot member 3a, and a locking means for the nut 17.

By conforming the upper jaw fully to the upper halves of the furcations, the force derived from the bolt and nut is not only most efficiently applied to the furcations, but the requisite magnitude of such force is minimized.

What I claim is:

1. A bicycle kick stand comprising an elongated leg having an upper end portion bent to form a pivot member affording swinging of the leg between a lowered position of use and a raised stored position, an upper and a lower jaw coacting to mount the leg operatively on a member of a bicycle frame, the lower jaw having at one end thereof a downturned lug in which said pivot member is journaled, a bracket disposed beneath the lower jaw and having end portions secured respectively to said lug and to the lower jaw and having a portion spaced from the lug and coacting with the lug to journal said pivot member, a spring urging the leg against said lug, a flange formed marginally on the lug and confronting the leg and notched to receive the leg under stress of said spring in either the use position or stored position of the leg, and means interconnecting the mid-portions of the jaws for stressing the jaws regulably toward each other and thus clamping them on the frame member.

2. A bicycle kick-stand comprising an elongated leg having an upper end portion bent to form a pivot member affording swinging of the leg between a lowered position of use and a raised stored position, an upper and a lower jaw coacting to mount the leg operatively on a pair of spaced bicycle frame members, the lower jaw having at one end thereof a downturned lug in which said pivot member is journaled, a spring urging the leg against said lug, means on the lug for releasably maintaining either the use position or stored position of the leg, the upper jaw being freely flexible and having spaced portions arched to accommodate said frame members between the jaws and having a depressed portion between its arched portions, means for securing opposed ends of the upper jaw to corresponding ends of the lower jaw, means interconnecting the mid portions of the jaws for regulably stressing the jaws toward each other and thus clamping the jaws on said frame members, such interconnecting means including a bolt headed above the upper jaw to take effect on such jaw and further including a nut transmitting stress to the lower jaw, a substantially U-shaped stress distributor set into and substantially coextensive with said depressed portion and transmitting to the upper jaw the stress applied by said interconnecting means, and a bracket secured to and beneath the lower jaw restraining said nut from rotation and having a portion spaced from and coacting with the lug to journal said pivot member.

References Cited in the file of this patent

UNITED STATES PATENTS

| | | |
|---|---|---|
| 1,771,167 | Dolan | July 22, 1930 |
| 2,595,193 | Haug | Apr. 29, 1952 |

FOREIGN PATENTS

| | | |
|---|---|---|
| 583,671 | France | Nov. 4, 1924 |
| 166,637 | Switzerland | Mar. 16, 1934 |